Oct. 14, 1924.

G. U. BRAKE 1,511,651

LOCK FOR CLUTCH MECHANISMS

Filed May 14, 1921

George U. Brake, Inventor

By Walter G. Burns, Attorney

Patented Oct. 14, 1924.

1,511,651

UNITED STATES PATENT OFFICE.

GEORGE U. BRAKE, OF FORT WAYNE, INDIANA, ASSIGNOR TO TOKHEIM OIL TANK AND PUMP COMPANY, A CORPORATION OF INDIANA.

LOCK FOR CLUTCH MECHANISMS.

Application filed May 14, 1921. Serial No. 469,750.

*To all whom it may concern:*

Be it known that I, GEORGE U. BRAKE, citizen of the United States of America, and resident of Fort Wayne, in the county of Allen and State of Indiana, have invented certain new and useful Improvements in Locks for Clutch Mechanisms, of which the following is a specification.

This invention relates to improvements in locks for clutch mechanism and is especially applicable to that type of mechanism employed for operating dispensing pumps in which a clutch is included for reversing the direction of motion imparted to the pump. The object of the invention is to provide means for locking the clutch out of engaging relation with the gearing so that the operating crank will rotate idly and be rendered useless in operating the pump.

This object is accomplished by the construction illustrated in the accompanying drawings in which:—

Figure 1:
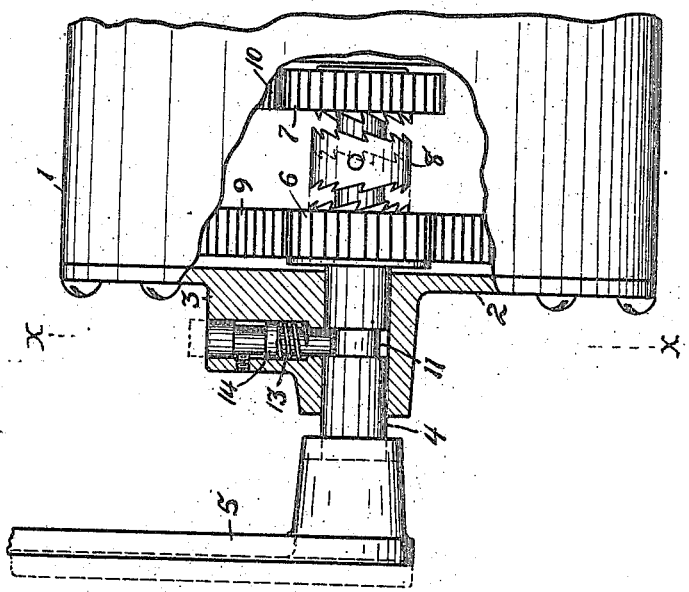
Figure 2:
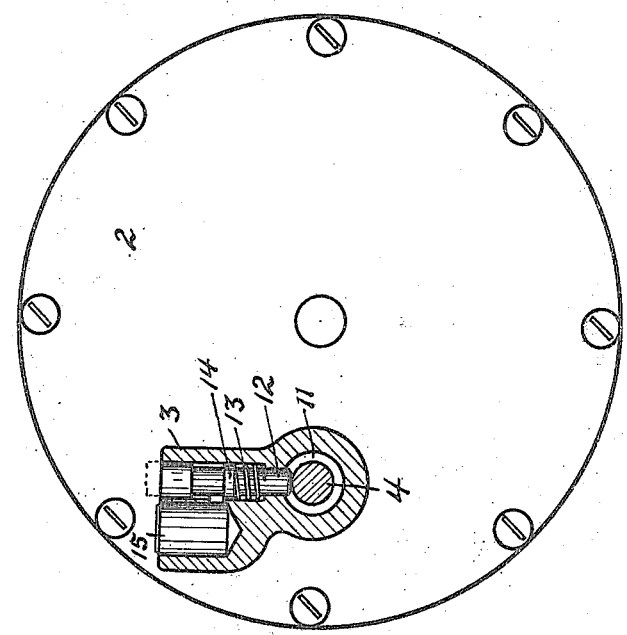

Fig. 1 is a side elevation showing a portion of a gear housing broken away and disclosing the clutch and gear mechanism used in driving a pump, and showing also the locking device; and Fig. 2 is a projection of Fig. 1 in a plane at right angles thereto and in section on the line $x$—$x$ thereof.

Similar characters of reference indicate corresponding parts in both views and having reference now to the same:—

1 is a gear housing having a head 2 provided with an outwardly extending boss 3. A drive-shaft 4 having a crank 5 upon its outer end, extends into the gear housing and has loosely mounted thereon two clutch gears 6 and 7 which are spaced apart. Also, upon the shaft is rigidly fixed a clutch member 8 at a point between the clutch gears, and which is adapted to selectively engage the clutch gears accordingly as the shaft 4 is longitudinally adjusted. It is the intention to apply the clutch gears in operative relation with gearing 9—10 for imparting movement to the pump in opposite directions in the usual manner, and the gearing may be of any suitable known construction. The shaft 4 is adapted to be moved longitudinally and rotated in the boss 3 so that when moved inwardly the clutch member will engage the clutch gear 7 and when moved outwardly the clutch member will engage the clutch gear 6. Also, when the shaft is positioned centrally the clutch member is held free from engagement with either of the clutch gears so that the shaft may then be rotated idly in neutral position. The shaft 4 has therein an annular recess 11 at a point thereon within the boss 3 adapted for the reception of a lock bolt 12, also movably positioned in the boss 3, the recess being located relative to the bolt so that when the bolt enters the recess the shaft will be held longitudinally in neutral position and with the clutch member disengaged from both clutch gears. A compression spring 13 acts against a collar 14 on the bolt and tends to hold the bolt out of the recess in the shaft, and a lock 15 imbedded in the boss is adapted to engage the collar 14 when the bolt is pressed into the recess, and hold the bolt in engaging position so that the shaft is prevented from being moved longitudinally.

In the operation of the invention the bolt is released by turning the lock, permitting the spring to lift the bolt from engagement in the recess 11 of the shaft so that the shaft may be moved lengthwise in either direction. Thus, the operator, by manipulating the crank may move the clutch member into engagement with either of the clutch gears and operate the pump in one direction or the other accordingly. When it is desired to secure the pump from being operated the shaft 4 is moved longitudinally by manipulating the crank so that the recess in the shaft is in line with the bolt, and the bolt is then pressed downwardly into locking position. The lock 15 which may be of any suitablt key-operated type engages the collar 14 when the bolt is pressed into locking engagement and prevents it from disengagement with the shaft until again released by the lock.

What I claim is:—

In combination with a mechanism including oppositely disposed driven members; a revoluble and longitudinally movable operating shaft extending through said members and having an annular recess therein; a clutch element on the shaft selectively engageable with said members accordingly as the shaft is longitudinally positioned; a spring pressed bolt arranged to be moved against the resistance of its spring into said recess so as to prevent longitudinal movement of the shaft and admit of rotary movement thereof when said shaft is positioned out of engagement with said members; and a key-operated lock operable to hold said bolt in said recess.

2. In a mechanism including a pair of oppositely disposed and spaced apart driven members, a revoluble and longitudinally movable crank-shaft extending loosely through each of said members; a clutch element on the shaft in the space between said members and having, selectively, actuating or neutral relation with the respective members accordingly as the shaft is longitudinally positioned; and a key-operated locking means operable to lock the shaft from having longitudinal movement but admitting of rotary movement thereof when the clutch is in neutral position only, and inoperable when the clutch element is engaged with either of said members.

In testimony whereof I affix my signature, in presence of two witnesses.

GEORGE U. BRAKE.

Witnesses:
MATILDA METTLER,
WALTER G. BURNS.